United States Patent
Meijer et al.

(10) Patent No.: US 11,796,070 B2
(45) Date of Patent: Oct. 24, 2023

(54) BALL VALVE ASSEMBLY

(71) Applicant: ONESUBSEA IP UK LIMITED, London (GB)

(72) Inventors: John Meijer, Sugar Land, TX (US); Mangesh Edke, Sugar Land, TX (US); Jiju Ninan, Pearland, TX (US); Adam Tusing, Houston, TX (US); Mahesh Shenoy, Katy, TX (US)

(73) Assignee: ONESUBSEA IP UK LIMITED, London (GB)

( * ) Notice: Subject to any disclaimer, the term of this patent is extended or adjusted under 35 U.S.C. 154(b) by 0 days.

(21) Appl. No.: 17/596,607

(22) PCT Filed: Jun. 24, 2020

(86) PCT No.: PCT/US2020/039340
§ 371 (c)(1),
(2) Date: Dec. 14, 2021

(87) PCT Pub. No.: WO2020/263963
PCT Pub. Date: Dec. 30, 2020

(65) Prior Publication Data
US 2022/0243826 A1    Aug. 4, 2022

Related U.S. Application Data

(60) Provisional application No. 62/866,017, filed on Jun. 25, 2019, provisional application No. 62/865,382, (Continued)

(51) Int. Cl.
*F16K 5/06* (2006.01)
*E21B 29/04* (2006.01)
(Continued)

(52) U.S. Cl.
CPC ............ *F16K 5/0605* (2013.01); *E21B 29/04* (2013.01); *E21B 34/10* (2013.01); *F16K 5/0689* (2013.01); *F16K 25/00* (2013.01); *F16K 27/067* (2013.01)

(58) Field of Classification Search
CPC ...... F16K 5/0605; F16K 5/0689; F16K 5/201; F16K 5/20; F16K 25/00; F16K 27/067; E21B 29/04; E21B 34/10; E21B 2200/04
See application file for complete search history.

(56) References Cited

U.S. PATENT DOCUMENTS

RE25,471 E  *  11/1963  Fredd ...................... E21B 34/10
                                                  166/321
4,009,753 A  *   3/1977  McGill .................. E21B 29/04
                                                  166/55.1
(Continued)

FOREIGN PATENT DOCUMENTS

JP      54008132 U    1/1979
JP      08128544 A    5/1996
(Continued)

OTHER PUBLICATIONS

International Preliminary Report on Patentability issued in the PCT Application PCT/US2020/039340 dated Jan. 6, 2022, 9 pages.
(Continued)

*Primary Examiner* — David Colon-Morales
(74) *Attorney, Agent, or Firm* — Eileen Pape

(57) ABSTRACT

A ball valve assembly includes a ball having a fluid pathway and a leading edge portion. The ball is configured to rotate between an open position and a closed position, the fluid pathway is configured to align with a fluid passage while the ball is in the open position, and the fluid pathway is configured to be offset from the fluid passage while the ball is in the closed position. Furthermore, the leading edge portion includes a first leading edge configured to cut a line (Continued)

extending through the fluid pathway as the ball rotates from the open position to the closed position, the leading edge portion includes a second leading edge configured to engage a seal of the ball valve assembly as the ball rotates from the open position to the closed position, and the first leading edge is positioned radially inward from the second leading edge.

12 Claims, 8 Drawing Sheets

Related U.S. Application Data filed on Jun. 24, 2019, provisional application No. 62/865,645, filed on Jun. 24, 2019.

(51) Int. Cl.
*E21B 34/10* (2006.01)
*F16K 27/06* (2006.01)
*F16K 25/00* (2006.01)

(56) References Cited

U.S. PATENT DOCUMENTS

| | | | | |
|---|---|---|---|---|
| 4,332,267 A | * | 6/1982 | Evans | E21B 34/12 251/210 |
| 4,522,370 A | * | 6/1985 | Noack | E21B 34/045 166/324 |
| 4,651,828 A | * | 3/1987 | Doremus | F16K 5/0652 251/315.08 |
| 6,041,806 A | | 3/2000 | Maichel | |
| 6,152,229 A | * | 11/2000 | Jennings | E21B 29/04 166/332.3 |
| 8,607,882 B2 | | 12/2013 | Kalb et al. | |
| 9,551,425 B2 | * | 1/2017 | Buck | E21B 34/14 |
| 9,657,550 B2 | | 5/2017 | Inglis et al. | |
| 9,957,772 B2 | * | 5/2018 | Tennant | E21B 29/08 |
| 10,221,652 B2 | | 3/2019 | Inglis et al. | |
| 10,450,834 B2 | * | 10/2019 | Manett | F16K 5/0605 |
| 11,248,440 B2 | * | 2/2022 | Manett | F16K 5/08 |
| 2010/0051847 A1 | * | 3/2010 | Mailand | E21B 29/04 166/55 |
| 2017/0335977 A1 | | 11/2017 | Salem et al. | |

FOREIGN PATENT DOCUMENTS

| | | |
|---|---|---|
| JP | 2014156912 A | 8/2014 |
| KR | 101475850 B1 | 12/2014 |

OTHER PUBLICATIONS

International Search Report and Written Opinion issued in the PCT Application PCT/US2020/039340, dated Sep. 28, 2020 (14 pages).

* cited by examiner

BALL VALVE ASSEMBLY

REFERENCE TO RELATED APPLICATIONS

This patent application claims the benefit of and incorporates by reference each of the following provisional applications: U.S. Provisional Pat. Appl. No. 62/865,382 filed Jun. 24, 2019; U.S. Provisional Pat. Appl. No. 62/865,645 filed Jun. 24, 2019; and U.S. Provisional Pat. Appl. No. 62/866,017 filed Jun. 25, 2019.

BACKGROUND

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

In order to meet consumer and industrial demand for natural resources, companies search for and extract oil, natural gas, and other subterranean resources from the earth. Once a desired subterranean resource is discovered, drilling and production systems are employed to access and extract the resource. These systems may be located onshore or offshore depending on the location of a desired resource. For example, in subsea operations, hydrocarbon fluids such as oil and natural gas are obtained from a subterranean geologic formation, referred to as a reservoir, by drilling a well that penetrates the hydrocarbon-bearing geologic formation. In various subsea applications and other well applications, ball valve assemblies are used to control fluid flow through a well string. Ball valve assemblies include a ball having a fluid pathway extending through the ball. While the ball valve assembly is in an open state (e.g., open position of the ball), the fluid pathway of the ball is aligned with a fluid passage of the ball valve assembly, thereby enabling fluid to flow through the ball valve assembly. In addition, while the ball valve assembly is in a closed state (e.g., closed position of the ball), the fluid pathway of the ball is oriented generally perpendicularly to the fluid passage of the ball valve assembly, thereby blocking fluid flow through the ball valve assembly. While the ball is in the closed position, a seal positioned at an end of the fluid passage contacts the ball to block the fluid flow. In certain applications, a wireline or coil tubing may extend through the fluid passage of the ball valve assembly and the fluid pathway of the ball while the ball valve assembly is in the open state (e.g., open position of the ball). Accordingly, to transition the ball valve assembly to the closed state (e.g., closed position of the ball), the ball is rotated such that a leading edge of the ball cuts the wireline or the coil tubing, thereby enabling the ball to rotate to the closed position. Unfortunately, the leading edge of the ball may deform in response to passing through the wireline/coil tubing, and the deformed leading edge may apply undesirable stress to the seal, thereby reducing the effectiveness of the seal.

BRIEF DESCRIPTION OF THE DRAWINGS

These and other features, aspects, and advantages of certain embodiments will become better understood when the following detailed description is read with reference to the accompanying drawings in which like characters represent like parts throughout the drawings, wherein.

DETAILED DESCRIPTION OF SPECIFIC EMBODIMENTS

Specific embodiments of the present disclosure are described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements. Moreover, any use of "top," "bottom," "above," "below," other directional terms, and variations of these terms is made for convenience, but does not require any particular orientation of the components.

Figure 1:
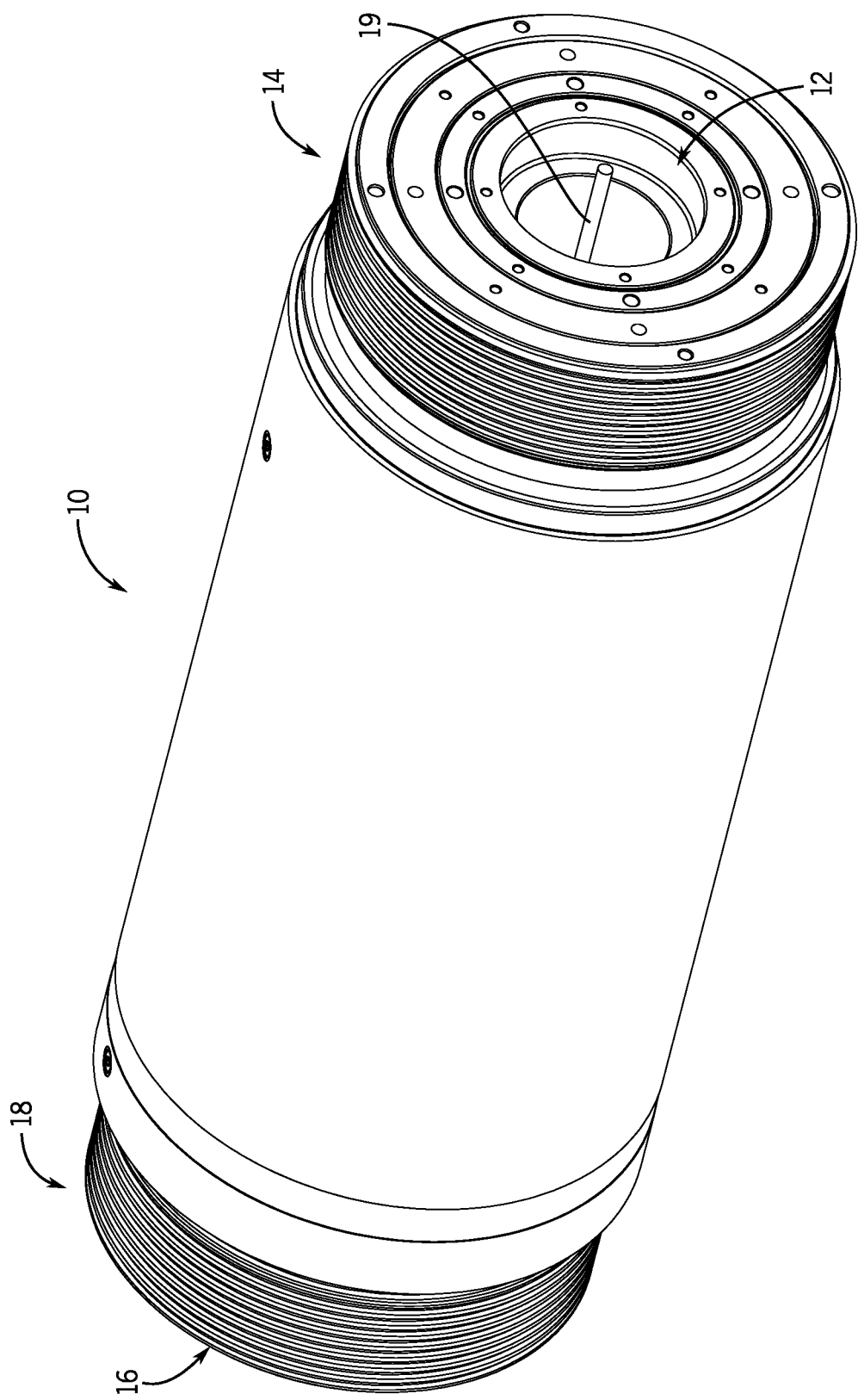
FIG. 1 is a perspective view of an embodiment of a ball valve assembly.

FIG. 1 is a perspective view of an embodiment of a ball valve assembly 10. In certain embodiments, the ball valve assembly 10 may be disposed along a well string, such as a landing string. For example, the ball valve assembly 10 may be used as a retainer valve within a subsea landing string. In the illustrated embodiment, the ball valve assembly 10 includes a first port 12 (e.g., to below-ball tubing) positioned at a first end portion 14 (e.g., downhole end portion) of the ball valve assembly 10, and the ball valve assembly 10 includes a second port 16 (e.g., to above-ball tubing) positioned at a second end portion 18 (e.g., uphole end portion) of the ball valve assembly 10. The first port 12 is configured to receive fluid (e.g., from a well), and the ball valve assembly 10 is configured to control flow of the fluid through the ball valve assembly 10 between the first port 12 and the second port 16. In addition, a line 19, such as a wireline or coil tubing, extends through the ball valve assembly 10.

As discussed in detail below, the ball valve assembly 10 includes a ball having a fluid pathway extending through the ball. The ball is configured to rotate between an open position and a closed position. The fluid pathway is configured to align with a fluid passage of the ball valve assembly 10 while the ball is in the open position to enable fluid flow through the ball valve assembly 10. In addition, the fluid pathway is configured to be offset from the fluid passage while the ball is in the closed position to block fluid flow through the ball valve assembly 10. In addition, the ball valve assembly includes an actuator assembly configured to drive the ball to rotate between the open position and the closed position. In the certain embodiments, the actuator assembly drives the ball to rotate in response to receiving pressurized hydraulic fluid. Accordingly, the ball valve assembly 10 may include first hydraulic input(s) (e.g., close hydraulic input(s)) and second hydraulic input(s) (e.g., open hydraulic input(s)). Applying pressurized hydraulic fluid to the first hydraulic input(s) (e.g., close hydraulic input(s)) causes the actuator assembly to drive the ball to the closed position, and applying pressurized hydraulic fluid to the second hydraulic input(s) (e.g., open hydraulic input(s)) causes the actuator assembly to drive the ball to the open position. If hydraulic fluid flow to the second hydraulic input(s) is interrupted, a compression spring within the ball valve assembly 10 may drive the ball to the closed position. Accordingly, the illustrated ball valve assembly is considered a failsafe closed ball valve assembly.

Furthermore, as discussed in detail below, the ball has a leading edge portion (e.g., positioned at/proximate to an end of the fluid pathway). In certain embodiments, the leading edge portion includes a first leading edge configured to cut the line (e.g., wireline, coil tubing, etc.) extending through the fluid pathway as the ball rotates from the open position to the closed position. The leading edge portion also includes a second leading edge configured to engage a seal of the ball valve assembly as the ball rotates from the open position to the closed position. The first leading edge is positioned radially inward from the second leading edge. Accordingly, the first leading edge may not contact the seal as the ball rotates from the open position to the closed position. By way of example, the first leading edge may deform in response to passing through the line (e.g., wireline, coil tubing, etc.). However, because the first leading edge is positioned radially inward from the second leading edge, the possibility of the deformed first leading edge contacting the seal is substantially reduced or eliminated. As a result, contact between the ball and the seal may substantially block fluid flow through the ball valve assembly while the ball is in the closed position (e.g., as compared to a seal that experiences deformation in response to contact with a deformed leading edge).

Figure 2:
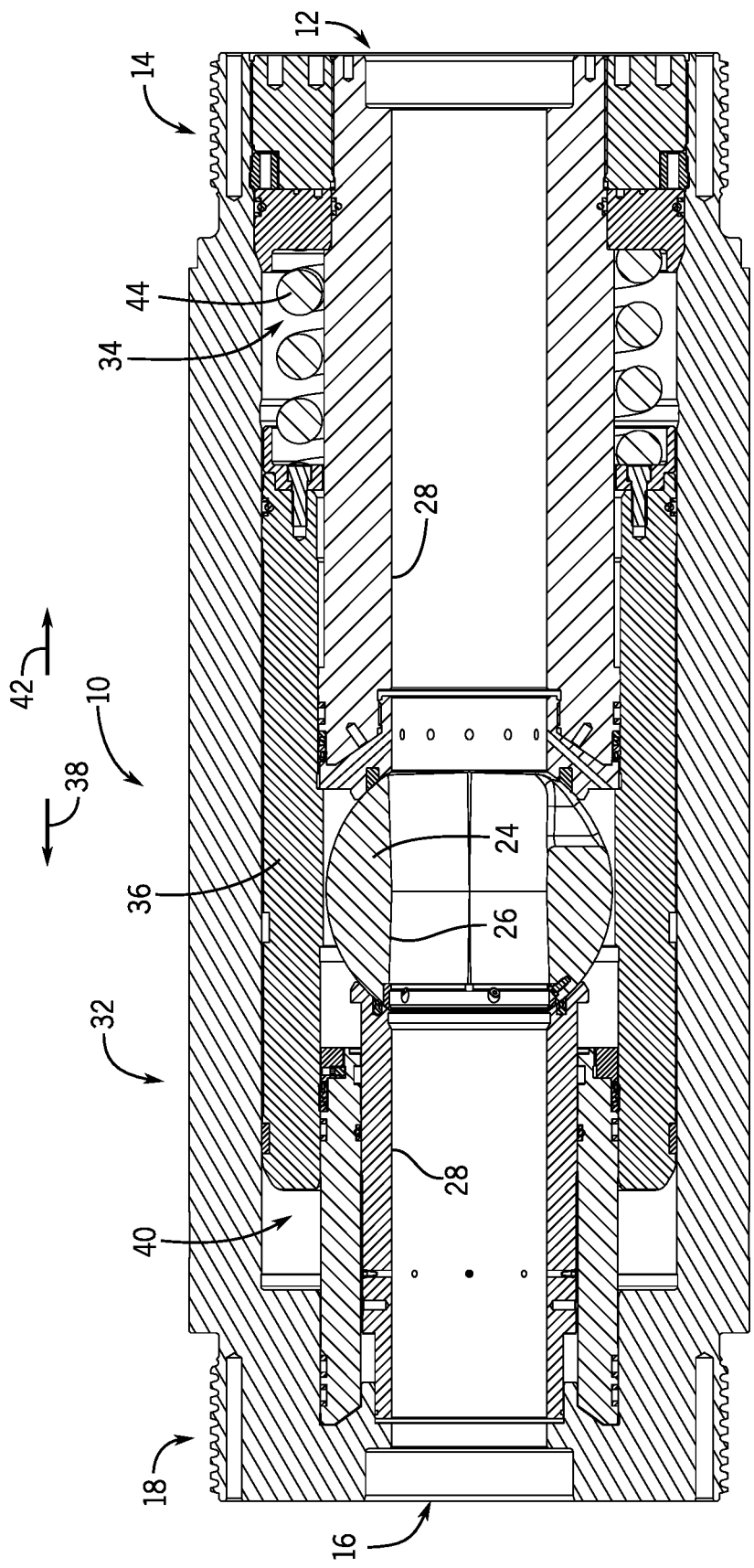
FIG. 2 is a cross-sectional view of the ball valve assembly of FIG. 1.

FIG. 2 is a cross-sectional view of the ball valve assembly 10 of FIG. 1. As previously discussed, the ball valve assembly 10 includes a first port 12 (e.g., to below-ball tubing) positioned at the first end portion 14 (e.g., downhole end portion) of the ball valve assembly 10, and the ball valve assembly 10 includes a second port 16 (e.g., to above-ball tubing) positioned at the second end portion 18 (e.g., uphole end portion) of the ball valve assembly 10. In addition, the ball valve assembly 10 includes a ball 24 configured to block fluid flow through the ball valve assembly 10 while the ball 24 is in the closed position and to enable fluid flow through the ball valve assembly 10 while the ball 24 is in the open position. While the ball 24 is in the illustrated open position, a fluid pathway 26 (e.g., wellbore tubing fluid pathway) extending through the ball 24 aligns with a fluid passage 28 (e.g., annular fluid passage) of the ball valve assembly 10. Accordingly, with the ball in the open position, fluid enters the first port 12, flows through the fluid passage 28 of the ball valve assembly 10 and the fluid pathway 26 of the ball 24, and exits the second port 16. In addition, while the ball 24 is in the closed position, the fluid pathway 26 is offset from the fluid passage 28 of the ball valve assembly 10, thereby blocking fluid flow through the ball valve assembly 10. As used herein, "offset" refers to an angle between the fluid pathway 26 and the fluid passage 28 that causes fluid flow through the ball valve assembly to be blocked (e.g., via contact between the outer surface of the ball and a respective seal). In certain embodiments, at least a portion of the fluid passage 28 is formed by internal above-ball tubing (e.g., above-ball tubing internal to the ball valve assembly), and/or at least a portion of the fluid passage 28 is formed by internal below-ball tubing (e.g., below-ball tubing internal to the ball valve assembly).

In the illustrated embodiment, the ball valve assembly 10 includes an actuator assembly 32 configured to drive the ball 24 to rotate between the open position and the closed position. To drive the ball 24 to the closed position, pressurized hydraulic fluid is supplied to the first hydraulic input(s) (e.g., close hydraulic input(s)). The pressurized hydraulic fluid flows from the first hydraulic input(s) (e.g., close hydraulic input(s)) to a close fluid chamber 34. The pressurized hydraulic fluid within the close fluid chamber 34 drives an operator 36 of the actuator assembly 32 to move in a first direction 38 (e.g., uphole direction), thereby driving the ball 24 to rotate between the illustrated open position and the closed position. For example, in certain embodiments, the ball includes a slot, and a slider is disposed within the slot. The slider includes a pin engaged with an aperture of the operator 36, which is positioned radially outward from the axis of rotation of the ball 24. Accordingly, as the operator 36 is driven to move in the first direction 38 (e.g., uphole direction), the operator 36 drives the ball 24 to rotate toward the closed position. In addition, to drive the ball 24 to the open position, pressurized hydraulic fluid is supplied to the second hydraulic input(s) (e.g., open hydraulic input(s)). The pressurized hydraulic fluid flows from the second hydraulic input(s) to an open control chamber 40. The pressurized hydraulic fluid within the open control chamber 40 drives the operator 36 of the actuator assembly 32 to move in a second direction 42 (e.g., downhole direction), opposite the first direction 38 (e.g., uphole direction), thereby driving the ball 24 to rotate between the closed position and the open position via the pin/slider/slot assembly.

In addition, in the illustrated embodiment, a compression spring 44 is disposed within the close fluid chamber 34. The compression spring 44 is configured to urge the operator 36 to move in the first direction 38 (e.g., uphole direction), thereby urging the ball 24 to rotate toward the closed position. Accordingly, to rotate the ball 24 to the open position, the operator 36 provides a sufficient force in the second direction 42 (e.g., downhole direction) to overcome the bias provided by the compression spring 44. In the illustrated embodiment, the compression spring 44 provide sufficient force to drive the ball 24 to the closed position in response to interruption in hydraulic fluid flow to the second hydraulic input(s). Accordingly, the illustrated ball valve assembly is considered a failsafe closed ball valve assembly. As use herein, "compression spring" refers to any device or combination of devices that apply a force in response to compression of the device(s), in which the force is applied in the opposite direction of the direction of compression.

While the actuator assembly includes an operator in the illustrated embodiment, in other embodiments, the actuator assembly may have other and/or additional suitable device(s) configured to drive the ball to rotate between the open and closed positions. For example, in certain embodiments, the actuator assembly may include a first piston positioned on a first side of the operator and a second piston positioned on a second side of the operator, opposite the first side. In such embodiments, the pistons may drive the operator to move in the first and second directions. Furthermore, while the actuator assembly includes a hydraulically operated actuator (e.g., operator) in the illustrated embodiment, in other embodiments, the actuator assembly may include one or more pneumatically operated actuators (e.g., pneumatic cylinder(s), etc.), one or more electrically operated actuators (e.g., solenoid(s), linear actuator(s), etc.), or a combination of different types of actuators. In addition, while the ball valve assembly is a failsafe closed ball valve assembly in the illustrated embodiment, in other embodiments, the ball valve assembly may be a failsafe open ball valve assembly, or another suitable type of ball valve assembly.

Figure 3:
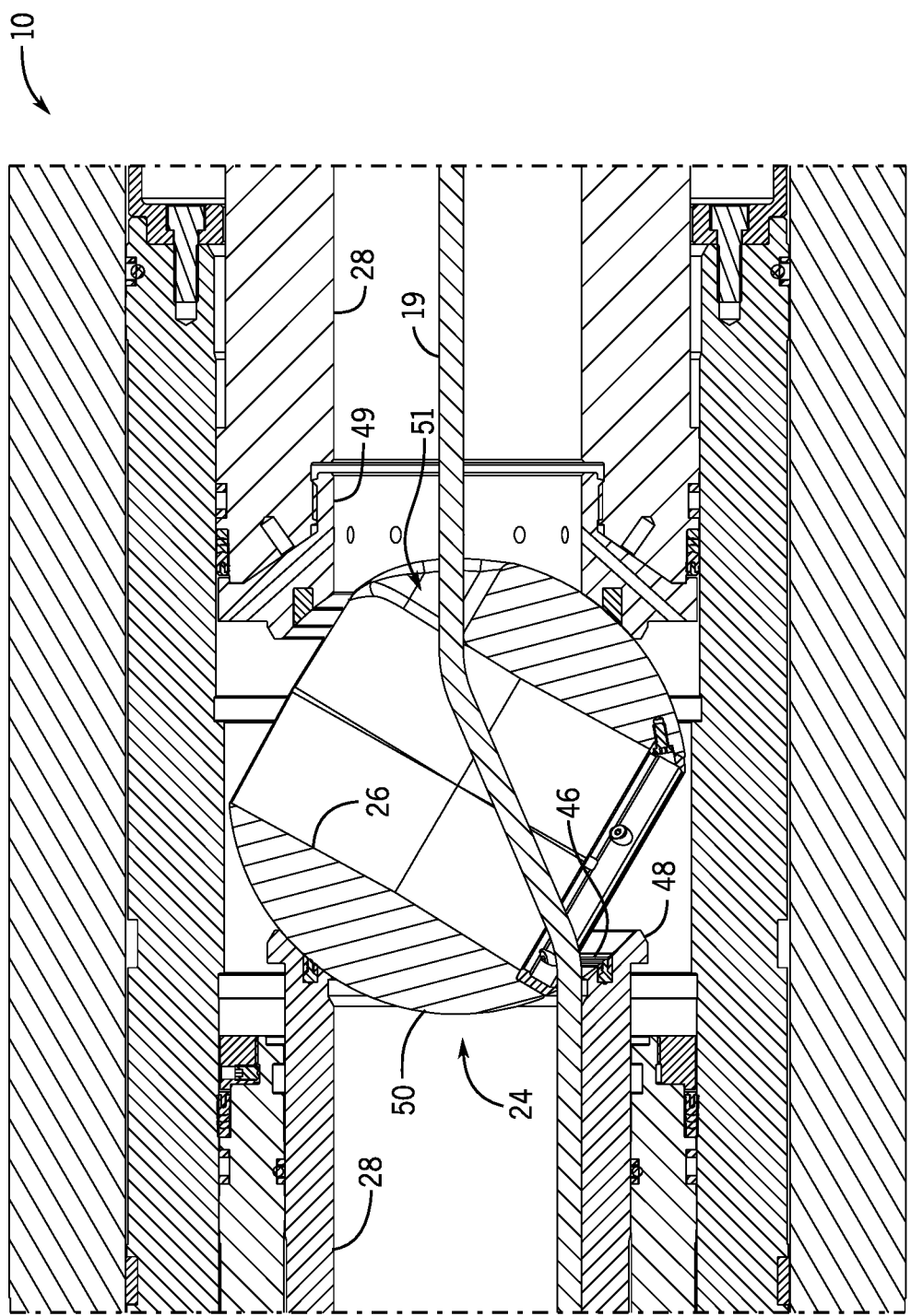
FIG. 3 is a cross-sectional view of a portion of the ball valve assembly of FIG. 1.

FIG. 3 is a cross-sectional view of a portion of the ball valve assembly 10 of FIG. 1. As illustrated, the ball 24 is oriented between the open position and the closed position. In addition, the line 19 extends through the fluid passage 28 of the ball valve assembly 10 and through the fluid pathway 26 of the ball 24. As discussed in detail below, the ball 24 is configured to cut the line 19 (e.g., wireline, coil tubing, etc.) as the ball 24 rotates toward the closed position, thereby enabling the ball 24 to reach the closed position.

In the illustrated embodiment, the ball valve assembly 10 includes a seal 46 and a seal retainer 48. The seal retainer 48 is configured to support the seal 46 within the ball valve assembly 10. In addition, the seal 46 (e.g., annular seal) is configured to contact/engage a body 50 of the ball 24 while the ball 24 is in the closed position to block fluid flow through the fluid passage 28. In the illustrated embodiment, the seal 46 is disposed within a recess (e.g., annular recess) of the seal retainer 48. However, in other embodiments, the seal may be coupled to the seal retainer via another suitable assembly/connection system (e.g., adhesive connection, fastener(s), etc.) or a combination of suitable assemblies/connection systems (e.g., the seal may be disposed within a recess and secured with an adhesive, etc.). In addition, the seal 46 may be formed from any suitable material (e.g., resilient material, such as rubber, silicon, etc.).

Furthermore, in the illustrated embodiment, the ball 24 has a cutout 51 configured to receive the line 19 as the line is being cut. Accordingly, the ball 24 may cut the line 19 at a single point, thereby reducing the force sufficient to cut the line 19. While the ball 24 has the cutout 51 in the illustrated embodiment, in other embodiments, the cutout may be omitted. In addition, in the illustrated embodiment, the ball 24 is supported by/captured between the seal retainer 48 and a cradle 49. In certain embodiments, the seal retainer 48 and/or the cradle 49 is biased toward the ball 24 (e.g., via hydraulic fluid pressure, via one or more springs, etc.), thereby facilitating formation of a seal between the ball 24 and the seal 46. While the ball is supported by/captured between the seal retainer and the cradle in the illustrated embodiment, in other embodiments, the ball may be supported by a trunnion or other suitable structure within the ball valve assembly.

Figure 4:
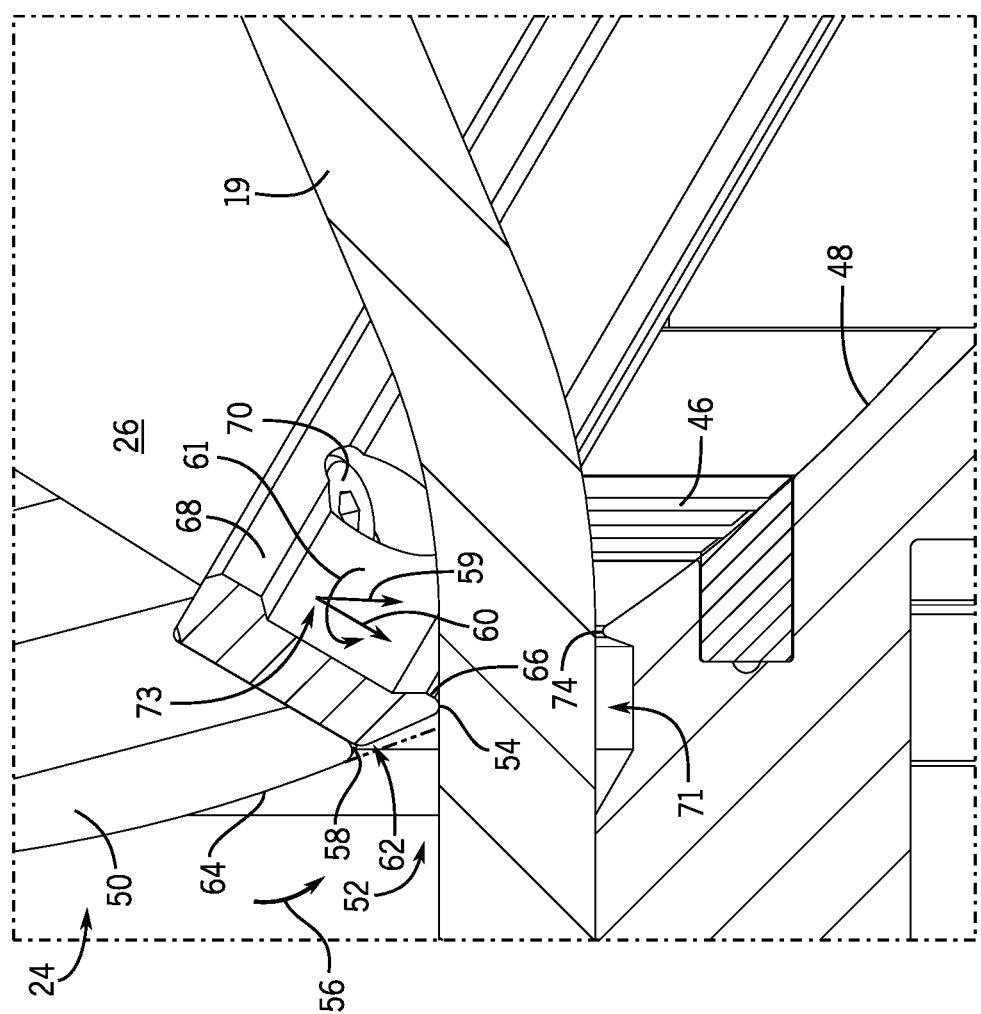
FIG. 4 is a detailed cross-sectional view of a portion of the ball valve assembly of FIG. 1.

FIG. 4 is a detailed cross-sectional view of a portion of the ball valve assembly 10 of FIG. 1. In the illustrated embodiment, the ball 24 includes a leading edge portion 52 having a first leading edge 54 (e.g., cutting edge) configured to cut the line 19 extending through the fluid pathway 26, which extends along a longitudinal axis 59 of the ball 24, as the ball 24 rotates in a rotational direction 56 from the open position to the closed position. In addition, the leading edge portion 52 includes a second leading edge 58 (e.g., seal-engaging edge) configured to engage the seal 46 as the ball 24 rotates in the rotational direction 56 from the open position to the closed position. As illustrated, the first leading edge 54 is positioned radially inward (e.g., inward along a radial axis 60 of the ball 24) from the second leading edge 58, and the second leading edge 58 is positioned circumferentially rearward of the first leading edge 54 (e.g., rearward along a circumferential axis 61 of the ball 24) relative to the rotational direction 56. Accordingly, a radial recess 62 is formed within the leading edge portion 52, and the second leading edge/seal-engaging edge is formed at the transition between the radial recess and the outer surface 64 of the ball. In certain embodiments, a first radius of curvature of the first leading edge 54 is less than a second radius of curvature of the second leading edge 58. Accordingly, the first leading edge 54 may apply greater pressure to the line 19 to facilitate cutting the line, and the second leading edge 58 may apply less pressure to the seal 46, thereby substantially reducing the possibility of undesirably deforming the seal. However, in other embodiments, the first radius of curvature of the first leading edge may be greater than or equal to the second radius of curvature of the second leading edge.

By way of example, as the first leading edge 54 cuts the line 19, the first leading edge 54 may deform. However, because the first leading edge 54 is positioned radially inward of the outer surface 64 of the body 50 of the ball 24, the possibility of the deformed first leading edge contacting the seal 46 is substantially reduced or eliminated. As a result, the structure of the seal 46 may be substantially maintained as the first leading edge 54 passes the seal 46 as the ball 24 rotates in the rotational direction 56. Accordingly, contact between the outer surface 64 of the body 50 of the ball 24 and the seal 46 may substantially block fluid flow through the ball valve assembly while the ball 24 is in the closed positioned (e.g., as compared to a seal that experiences significant stress/undesirable deformation in response to contact with a deformed leading edge).

The shape of the first leading edge, the shape of the second leading edge, and the extent of the radial recess along the radial axis of the ball may be selected based on the characteristics of the ball valve assembly and/or the expected operating conditions (e.g., the size of the seal, the expected thickness of the line, the type of material forming the line, the properties of the material forming the leading edges, etc.). For example, the first leading edge 54 may have a rounded shape, as illustrated, or the first leading edge may be pointed, as discussed in detail below. In addition, the first leading edge may be shaped to deform substantially radially inward in response to contact with the line, thereby further reducing the possibility of contact between the deformed first leading edge and the seal. For example, in the illustrated embodiment, a recess 66 is formed radially inward of the first leading edge 54 to facilitate radially inward deformation of the first leading edge 54 in response to contact with the line. However, in other embodiments, the recess may be omitted. Furthermore, the radial extent of the radial recess may be larger for applications in which a larger deformation of the first leading edge is expected (e.g., in embodiments in which the first leading edge is formed from a softer material, in applications in which a thicker/stronger line extends through the ball valve assembly, etc.), and the radial extent of the radial recess may be smaller for applications in which a smaller deformation of the first leading edge is expected (e.g., in embodiments in which the first leading edge is formed from a harder material, in applications in which a thinner/weaker line extends through the ball valve assembly, etc.).

In the illustrated embodiment, the ball 24 includes the body 50 and an insert 68 coupled to the body 50. The first leading edge 54 is formed on the insert 68, and the second leading edge 58 is formed on the body 50. In the illustrated embodiment, the insert 68 is coupled to the body 50 by fasteners 70 (e.g., distributed about the fluid pathway 26 along the circumferential axis 61 of the ball 24). However, in other embodiments, the insert may be coupled to the body by another suitable connection system (e.g., press fit, adhesive, welded, etc.). While the first leading edge is formed on the insert in the illustrated embodiment, in other embodiments, the first leading edge may be formed on the body of the ball, and the insert may be omitted. Furthermore, while the second leading edge is formed on the body of the ball in the illustrated embodiment, in other embodiments, the second leading edge may be formed on the insert or on a second insert.

In the illustrated embodiment, the seal retainer 48 includes a corresponding cutting edge 74 configured to cooperate with the first leading edge 54 to cut the line 19. In addition, the seal retainer 48 includes a recess 71 positioned on an opposite side of the corresponding cutting edge 74 from the ball 24. The recess 71 is configured to facilitate movement of the cut line material away from the ball/seal retainer interface, thereby facilitating movement of the ball toward the closed position and/or substantially reducing debris accumulation on the seal. Furthermore, in the illustrated embodiment, the insert 68 includes a recess 73 positioned radially inward from the first leading edge 54. The recess 73 of the insert is configured to facilitate movement of the cut line material away from the ball/seal retainer interface, thereby facilitating movement of the ball toward the closed position and/or substantially reducing debris accumulation on the seal. While the recess is formed within the insert in the illustrated embodiment, in other embodiments (e.g., embodiment in which the insert is omitted), the recess may be formed within the body of the ball. In addition, at least one of the recess of the ball or the recess of the seal retainer may be omitted. Furthermore, in certain embodiments, the corresponding cutting edge may be omitted.

Figure 5:
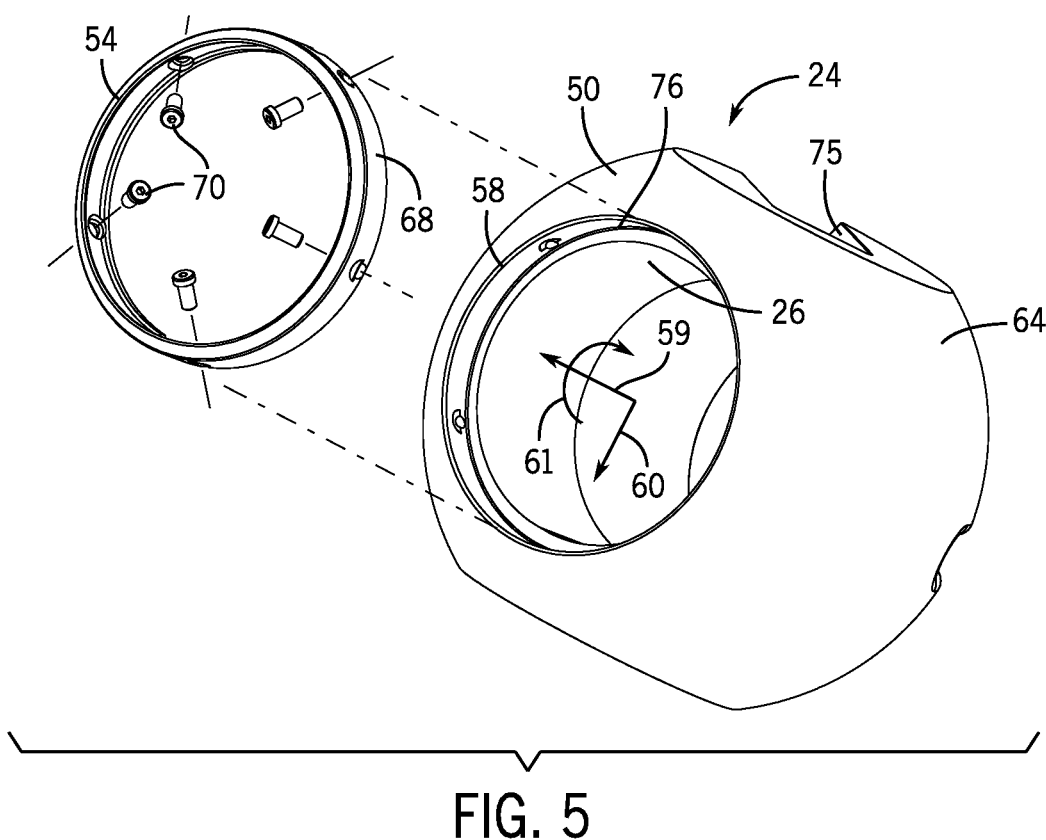
FIG. 5 is an exploded view of an embodiment of a ball that may be employed within the ball valve assembly of FIG. 1.

FIG. 5 is an exploded view of an embodiment of a ball 24 that may be employed within the ball valve assembly of FIG. 1. As previously discussed, the first leading edge 54 is formed on the insert 68, and the second leading edge 58 is formed on the body 50 of the ball 24. In the illustrated embodiment, the insert 68 is annular (e.g., extends along the circumferential axis 61 of the ball 24 about the entire fluid pathway 26). Accordingly, the body 50 of the ball 24 has an annular recess 76 configured to receive the insert 68. However, in other embodiments, the insert may be arcuate (e.g., the insert may only extend about a portion of the circumferential extent of the fluid pathway). In such embodiments, the body may have a correspondingly shaped recess. Furthermore, in certain embodiments, the recess may be omitted and the insert may be disposed within the fluid pathway and/or on the outer surface of the body. In the illustrated embodiment, the insert 68 is coupled to the body 50 of the ball 24 by fasteners 70. For example, five fasteners 70 couple the insert 68 to the body in the illustrated embodiment. However, in other embodiments, more or fewer fasteners (e.g., 1, 2, 3, 4, 5, 6, 7, 8, or more) may couple the insert to the body. Furthermore, in certain embodiments, the insert may be coupled to the body in another suitable manner (e.g., via an adhesive connection, via welding, via a press fit connection, via a threaded connection, etc.). Forming the first leading edge on the insert may reduce the manufacturing cost of the ball (e.g., as compared to forming the first leading edge on the body of the ball) because precisely forming a smaller part, such as the insert (e.g., via a machining process), may be less expensive than precisely forming a larger part, such as the body of the ball (e.g., via a machining process). In addition, forming the first leading edge on the insert enables the first leading edge to be replaced (e.g., if the first leading edge is deformed in response to contact with a line), thereby reducing maintenance costs (e.g., as compared to replacing the entire ball).

The body 50 of the ball 24 may be formed from any suitable material (e.g., steel, a nickel alloy, etc.). In addition, the insert 68 may be formed from any suitable material (e.g., steel, a nickel alloy, ceramic, a tungsten alloy, etc.). For example, the insert may be formed from a harder material than the body of the ball to reduce the deformation of the first leading edge as the first leading edge cuts the line. Furthermore, any suitable coating may be applied to the body of the ball and/or the insert. For example, the insert may be coated with a hard material (e.g., tungsten carbine, diamond-like carbon, etc.) to further reduce deformation of the first leading edge.

In the illustrated embodiment, the ball 24 includes a slot 75 configured to receive a slider (e.g., slider pin). As previously discussed, the slider includes a pin (e.g., forming the slider pin) engaged with an aperture (e.g., pin socket, socket hole) of the operator, and the operator is configured to drive the ball to rotate via translational movement of the operator. While the ball includes the slot in the illustrated embodiment, in other embodiments, the ball may include any other suitable device(s) configured to interface with an actuator assembly configured to drive the ball to rotate.

Figure 6:
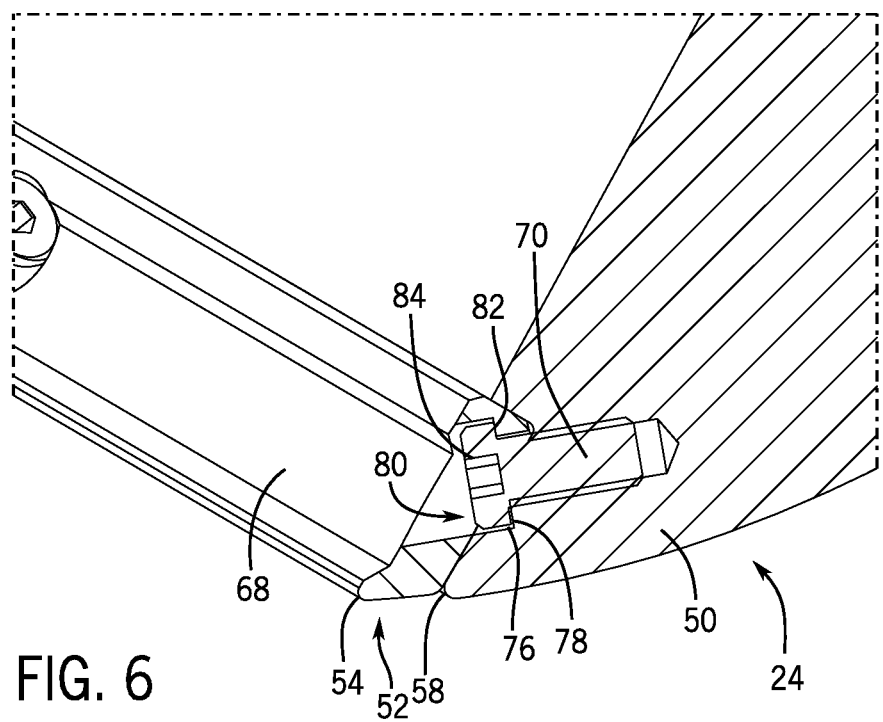
FIG. 6 is a cross-sectional view of a portion of the ball of FIG. 5.

FIG. 6 is a cross-sectional view of a portion of the ball 24 of FIG. 5. As previously discussed, the insert 68 is disposed within a recess 76 of the body 50 of the ball 24, and the insert 68 is coupled to the body 50 by fasteners 70. In the illustrated embodiment, the body 50 has a first portion 78 of a shoulder 80, and the insert 68 has a second portion 82 of the shoulder 80. As illustrated, a head 84 of the fastener 70 contacts the first portion 78 of the shoulder 80 and the second portion 82 of the shoulder 80 while the fastener 70 is engaged with the insert 68 and the body 50. Contact between the head 84 of the fastener 70 and the second portion 82 of the shoulder 80 couples the insert 68 to the body 50 of the ball 24. Because the shoulder 80 is split between the insert 68 and the body 50, the insert 68 may be positioned more precisely relative to the body 50 (e.g., as compared to an insert having the entire shoulder). In certain embodiments, the split shoulder configuration may be utilized for each fastener. However, in other embodiments, the split shoulder configuration may be utilized for a portion of the fasteners (e.g., and shoulders formed entirely on the insert may be utilized for the other fasteners). Furthermore, in other embodiments, all of the shoulders may be formed entirely on the insert. In addition, while the split shoulder configuration disclosed herein is utilized for coupling an insert to a body of a ball, the split shoulder configuration may be used to couple any suitable components to one another, such as components within the ball valve assembly or components within another assembly/system. The ball 24 disclosed above with reference to FIGS. 2-6 may be utilized within a newly manufactured ball valve assembly or retrofitted into an existing ball valve assembly.

Figure 7:
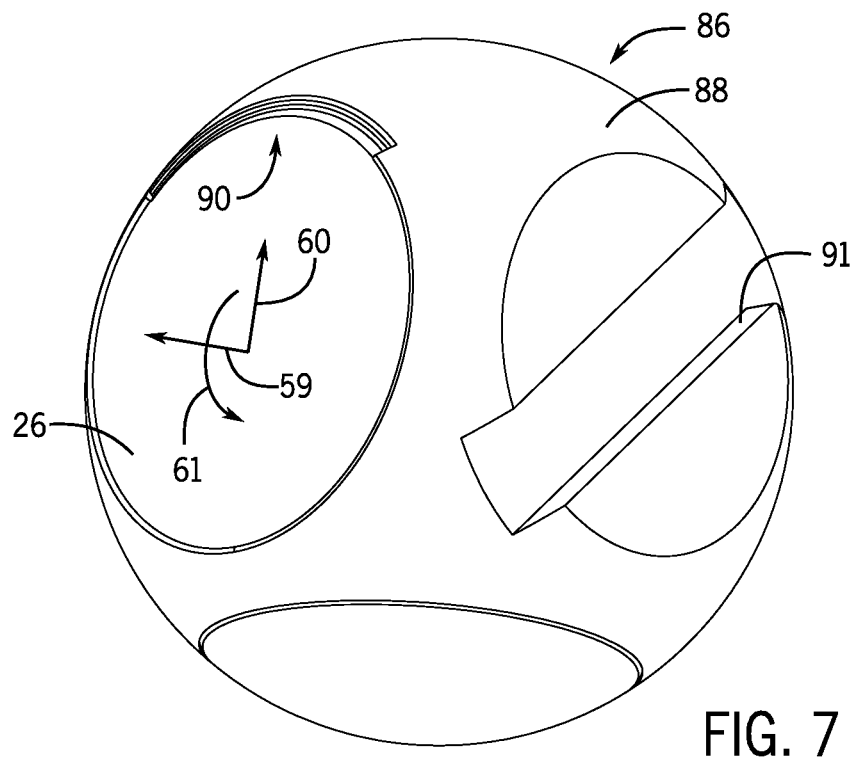
FIG. 7 is a perspective view of another embodiment of a ball that may be employed within the ball valve assembly of FIG. 1.

FIG. 7 is a perspective view of another embodiment of a ball 86 that may be employed within the ball valve assembly of FIG. 1. In the illustrated embodiment, the ball 86 has the fluid pathway 26 extending through a body 88 of the ball 86. As previously discussed, the fluid pathway 26 is configured to align with the fluid passage of the ball valve assembly while the ball 86 is in the open position to enable fluid flow through the ball valve assembly. In addition, the fluid pathway 26 is configured to be offset from the fluid passage while the ball 86 is in the closed position to block fluid flow through the ball valve assembly. Furthermore, in the illustrated embodiment, the ball 86 includes a leading edge portion 90 having a first leading edge configured to cut the line as the ball 86 rotates from the open position to the closed position. The leading edge portion 90 also includes a second leading edge configured to engage the seal as the ball 86 rotates from the open position to the closed position. The first leading edge is positioned radially inward from the second leading edge. In the illustrated embodiment, the ball 86 is formed from a single piece of material. Accordingly, the body of the ball forms the first leading edge and the second leading edge. In addition, in the illustrated embodiment, the leading edge portion 90, which includes the first leading edge and the second leading edge, is arcuate and extends about a portion of the circumferential extent of the fluid pathway 26 (e.g., extent of the fluid pathway 26 along the circumferential axis 61 of the ball 86). However, in other embodiments, the leading edge portion, which includes the first leading edge and the second leading edge, may be annular and may extend about the entire circumferential extent of the fluid pathway. Furthermore, any suitable coating may be applied to the body of the ball.

In the illustrated embodiment, the ball 86 includes a slot 91 configured to receive a slider. As previously discussed, the slider includes a pin engaged with an aperture of the operator, and the operator is configured to drive the ball to rotate via translational movement of the operator. While the ball includes the slot in the illustrated embodiment, in other embodiments, the ball may include any other suitable device(s) configured to interface with an actuator assembly configured to drive the ball to rotate.

Figure 8:
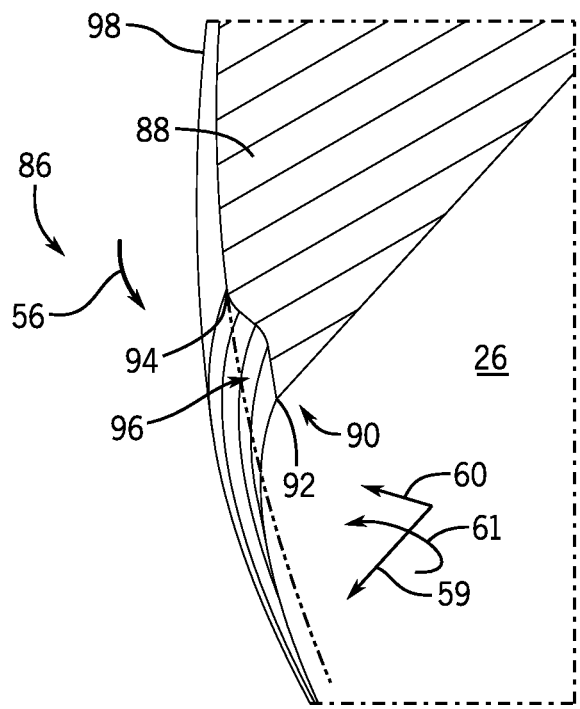
FIG. 8 is a cross-sectional view of a portion of the ball of FIG. 7.

FIG. 8 is a cross-sectional view of a portion of the ball 86 of FIG. 7. In the illustrated embodiment, the leading edge portion 90 of the ball 86 includes a first leading edge 92 (e.g., cutting edge) configured to cut the line extending through the fluid pathway 26, which extends along the longitudinal axis 59 of the ball 86, as the ball 86 rotates in the rotational direction 56 from the open position to the closed position. In addition, the leading edge portion 90 includes a second leading edge 94 (e.g., seal-engaging edge) configured to engage the seal as the ball 86 rotates in the rotational direction 56 from the open position to the closed position. As illustrated, the first leading edge 92 is positioned radially inward (e.g., inward along the radial axis 60 of the ball 86) from the second leading edge 94, and the second leading edge 94 is positioned circumferentially rearward of the first leading edge 92 (e.g., rearward along the circumferential axis 61 of the ball 86) relative to the rotational direction 56. Accordingly, a radial recess 96 is formed within the leading edge portion 90, and the second leading edge/seal-engaging edge is formed at the transition between the radial recess and the outer surface of the ball. In certain embodiments, a first radius of curvature of the first leading edge 92 is less than a second radius of curvature of the second leading edge 94. Accordingly, the first leading edge 92 may apply greater pressure to the line to facilitate cutting the line, and the second leading edge 94 may apply less pressure to the seal, thereby substantially reducing the possibility of undesirably deforming the seal. However, in other embodiments, the first radius of curvature of the first leading edge may be greater than or equal to the second radius of curvature of the second leading edge.

By way of example, as the first leading edge 92 cuts the line, the first leading edge 92 may deform. However, because the first leading edge 92 is positioned radially inward of the outer surface 98 of the body 88 of the ball 86, the possibility of the deformed first leading edge contacting the seal is substantially reduced or eliminated. As a result, the structure of the seal may be substantially maintained as the first leading edge 92 passes the seal as the ball 86 rotates in the rotational direction 56. Accordingly, contact between the outer surface 98 of the body 88 of the ball 86 and the seal may substantially block fluid flow through the ball valve assembly while the ball 86 is in the closed positioned (e.g., as compared to a seal that experiences significant stress/undesirable deformation in response to contact with a deformed leading edge).

The shape of the first leading edge, the shape of the second leading edge, and the extent of the radial recess along the radial axis of the ball may be selected based on the characteristics of the ball valve assembly and/or the expected operating conditions (e.g., the size of the seal, the expected thickness of the line, the type of material forming the line, the properties of the material forming the leading edges, etc.). For example, the first leading edge 92 may have a pointed shape, as illustrated, or the first leading edge may have a rounded shape. In addition, the first leading edge may be shaped to deform substantially radially inward in response to contact with the line, thereby further reducing the possibility of contact between the deformed first leading edge and the seal. For example, a recess may be formed radially inward of the first leading edge to facilitate radially inward deformation of the first leading edge in response to contact with the line. Furthermore, the radial extent of the radial recess may be larger for applications in which a larger deformation of the first leading edge is expected (e.g., in embodiments in which the first leading edge is formed from a softer material, in applications in which a thicker/stronger line extends through the ball valve assembly, etc.), and the radial extent of the radial recess may be smaller for applications in which a smaller deformation of the first leading edge is expected (e.g., in embodiments in which the first leading edge is formed from a harder material, in applications in which a thinner/weaker line extends through the ball valve assembly, etc.). The ball 86 disclosed above with reference to FIGS. 7-8 may be utilized within a newly manufactured ball valve assembly or retrofitted into an existing ball valve assembly.

Figure 9:
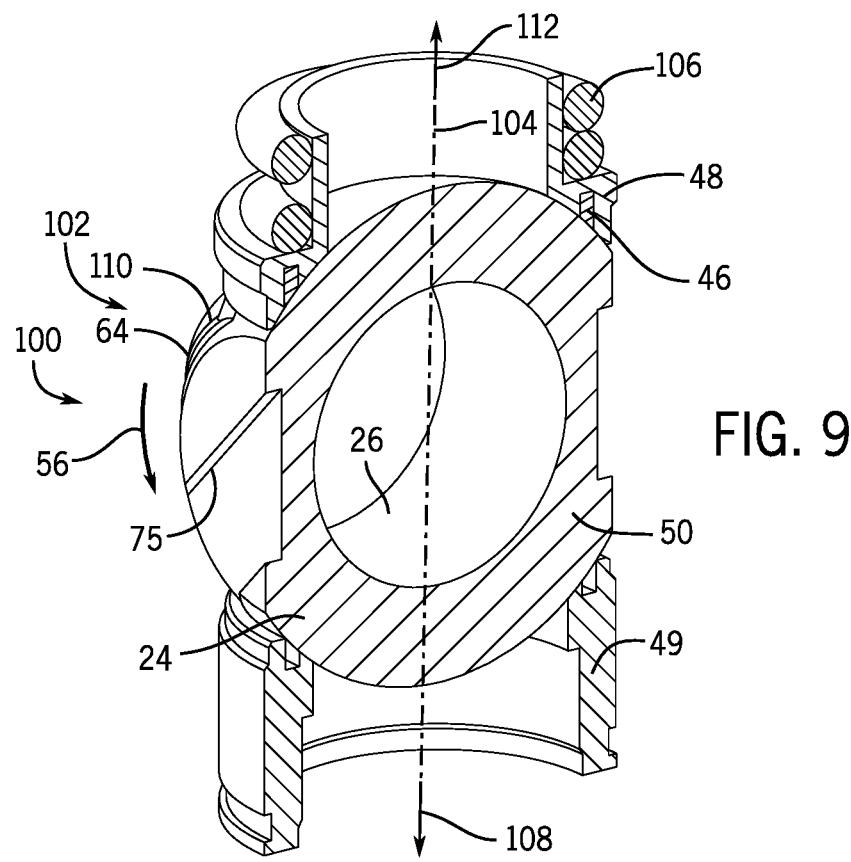
FIG. 9 is a cross-sectional perspective view of a portion of another embodiment of a ball valve assembly.

FIG. 9 is a cross-sectional perspective view of a portion of another embodiment of a ball valve assembly 100. In the illustrated embodiment, the ball valve assembly 100 includes a seal retainer actuator assembly 102 configured to move the seal retainer 48 away from the ball 24 along a longitudinal axis 104 of the ball valve assembly 100 while the leading edge portion (e.g., at least the first leading edge of the leading edge portion) moves across the seal 46, thereby further reducing the possibility of contact between a deformed first leading edge and the seal. As a result, contact between the body 50 of the ball 24 and the seal 46 may substantially block fluid flow through the ball valve assembly 100 while the ball 24 is in the illustrated closed position.

In the illustrated embodiment, the seal retainer 48 is movable along the longitudinal axis 104 relative to the ball 24. In addition, the ball valve assembly 100 includes a spring 106 configured to urge the seal retainer 48 toward the ball 24 in a first longitudinal direction 108 along the longitudinal axis 104. In the illustrated embodiment, the spring 106 includes a single coil compression spring. However, in other embodiments, the spring may include one or more other suitable biasing devices (e.g., alone or in combination with the single coil compression spring), such as leaf spring(s), piece(s) of resilient material, pneumatic spring(s), hydraulic spring(s), electromagnetic spring(s), etc. Furthermore, in certain embodiments, hydraulic pressure within the ball valve assembly may also urge the seal retainer toward the ball along the longitudinal axis. Accordingly, in certain embodiments, the spring may be omitted, and the hydraulic pressure may urge the seal retainer toward the ball.

In the illustrated embodiment, the ball 24 includes a cam 110 configured to contact the seal retainer 48 to drive the seal retainer 48 and the seal 46 away from the ball 24 in a second longitudinal direction 112 while the leading edge portion of the ball (e.g., at least the first leading edge of the leading edge portion) moves across the seal along the rotational direction 56. The cam 110 may have any suitable shape to control the position of the seal retainer 48 relative to the ball 24. For example, the cam may have the same diameter as the body of the ball, and the cam may be offset from the outer surface of the body of the ball. By way of further example, the cam may include a first portion configured to progressively move the seal retainer in the second longitudinal direction 112 until a target separation distance between the seal and the outer surface of the ball is achieved. The cam may also include a second portion configured to maintain the target separation distance as the leading edge portion (e.g., at least the first leading edge of the leading edge portion) traverses the seal. In addition, the cam may include a third portion configured to enable the seal retainer to progressively move in the first longitudinal direction 108 until the seal contacts the outer surface of the body of the ball (e.g., at the end of the cam). However, in other embodiments, the cam may have more or fewer portions (e.g., 1, 2, 3, 4, 5, 6, or more). While the ball has a single cam in the illustrated embodiment, in other embodiments, the ball may include additional cams (e.g., 2, 3, 4, or more). For example, one cam may be positioned on each side of the ball to contact respective sides of the seal retainer.

Furthermore, in certain embodiments, the cam 110 may be coupled to the body 50 of the ball 24 (e.g., to the outer surface 64 of the body). For example, the cam may be coupled to the body by welding, an adhesive connection, fastener(s), a press fit connection, another suitable connection, or a combination thereof. In addition, in certain embodiments, the shape of the cam may be modified (e.g., via a machining process) after the cam is coupled to the body of the ball. Furthermore, in certain embodiments, the cam may be integrally formed with the body of the ball (e.g., via a casting process, an additive manufacturing process, a machining process, or a combination thereof). For example, in certain embodiments, the body of the ball and the cam may be formed from a single piece of material. While the ball includes the slot 75 in the illustrated embodiment, in other embodiments, the ball may include any other suitable device(s) configured to interface with an actuator assembly configured to drive the ball to rotate.

Figure 10:
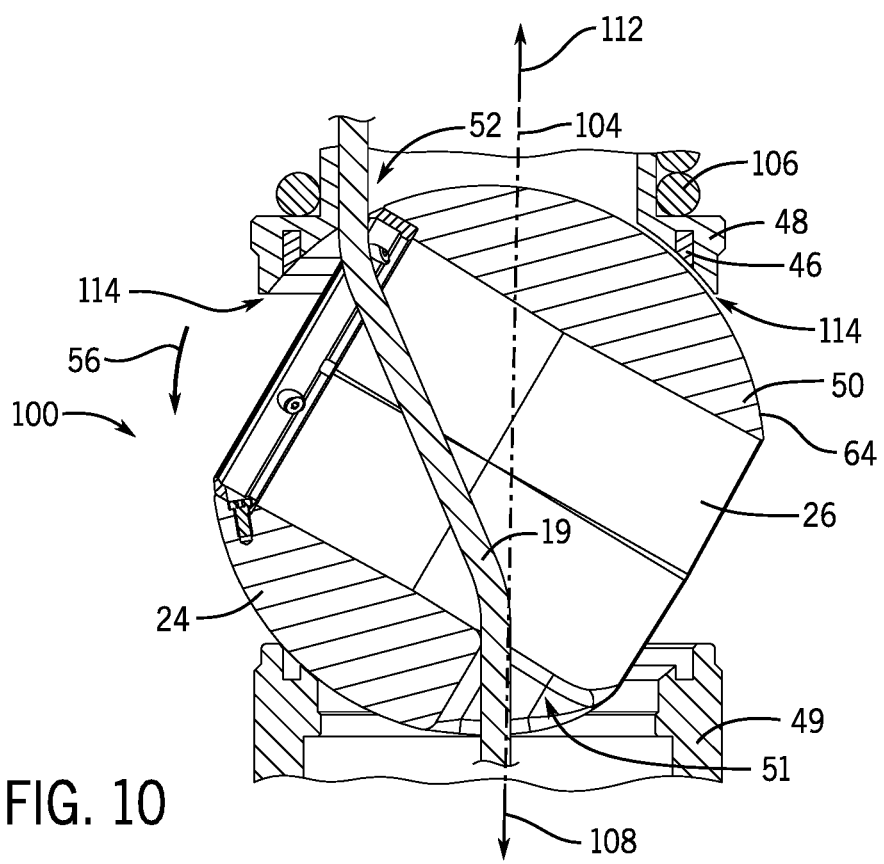
FIG. 10 is a cross-sectional view of the ball valve assembly of FIG. 9, in which a line extending through a fluid pathway of a ball of the ball valve assembly is being cut.

FIG. 10 is a cross-sectional view of the ball valve assembly 100 of FIG. 9, in which the line 19 extending through the fluid pathway 26 of the ball 24 of the ball valve assembly 100 is being cut. As illustrated, the first leading edge of the leading edge portion 52 is engaged with the line 19. In addition, the line 19 extends through the cutout 51 of the ball 24. Accordingly, the line 19 is being cut at a single point. Furthermore, as the ball 24 rotates in the rotational direction 56, the cam drives the seal retainer 48 away from the ball 24 along the second longitudinal direction 112, thereby establishing a gap 114 (e.g., separation distance along the radial axis of the ball) between the seal 46 and the outer surface 64 of the body 50 of the ball 24. The cam may be configured to maintain the extent of the gap or increase the extent of the gap as the leading edge portion 52 traverses the seal 46, thereby reducing the possibility of contact between a deformed first leading edge of the leading edge portion and the seal. As a result, contact between the body of the ball and the seal may substantially block fluid flow through the ball valve assembly while the ball is in the closed position. In addition, the friction associated with rotation of the ball may be reduced through a portion of the rotational range of motion of the ball from the open position to the closed position.

Figure 11:
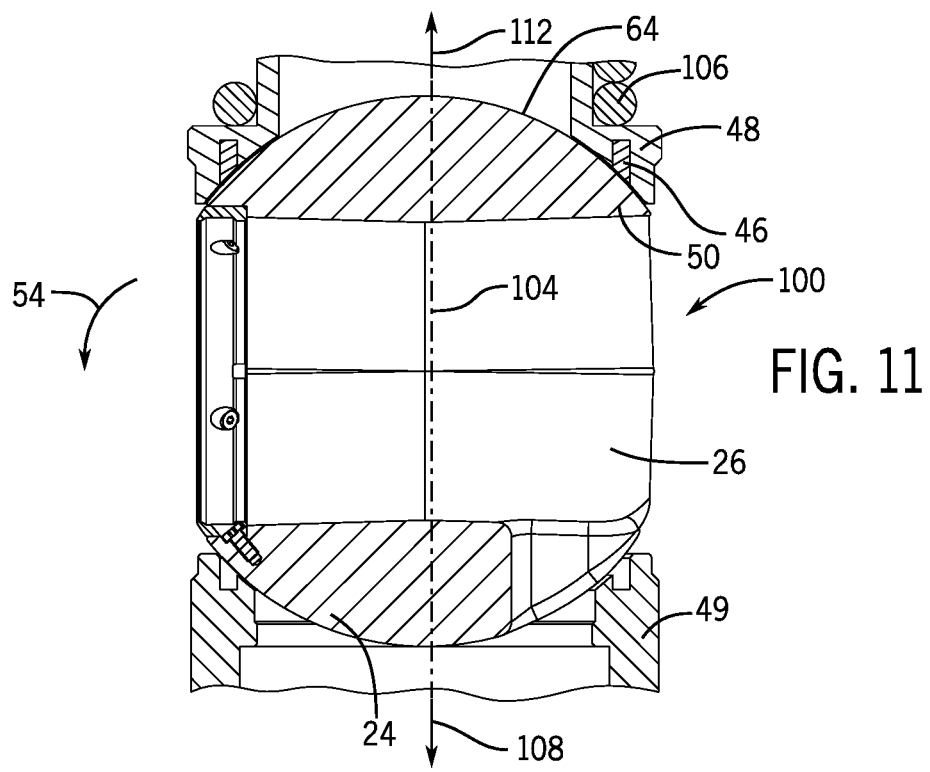
FIG. 11 is a cross-sectional view of the ball valve assembly of FIG. 9, in which the ball is in a closed position.

FIG. 11 is a cross-sectional view of the ball valve assembly 100 of FIG. 9, in which the ball 24 is in the closed position. With the ball 24 in the illustrated closed position, the cam is disengaged from the seal retainer 48. As such, the seal 46 contacts the outer surface 64 of the body 50 of the ball 24. As a result, fluid flow through the ball valve assembly 100 is blocked while the ball is in the illustrated closed position.

While the ball 24 of FIGS. 2-6, which includes the body and the insert, is utilized within the ball valve assembly 100 in the illustrated embodiment, in other embodiments, the ball valve assembly may include the ball 86 of FIGS. 7-8, in which the first and second leading edges are formed by the body. Furthermore, in certain embodiments, the ball valve assembly having the seal retainer actuator assembly may include any other suitable ball, such as a ball having the variations disclosed above with reference to FIGS. 2-8. In addition, in certain embodiments, a ball having a single leading edge (e.g., no radial recess in the leading edge portion) may be employed within the ball valve assembly of FIGS. 9-11. Furthermore, while the ball is supported by/captured between the seal retainer and the cradle in the illustrated embodiment, in other embodiments, the ball may be supported by a trunnion or other suitable structure within the ball valve assembly, and the seal retainer may be biased toward the ball such that the seal contacts the ball at least while the ball is in the closed position.

Figure 12:
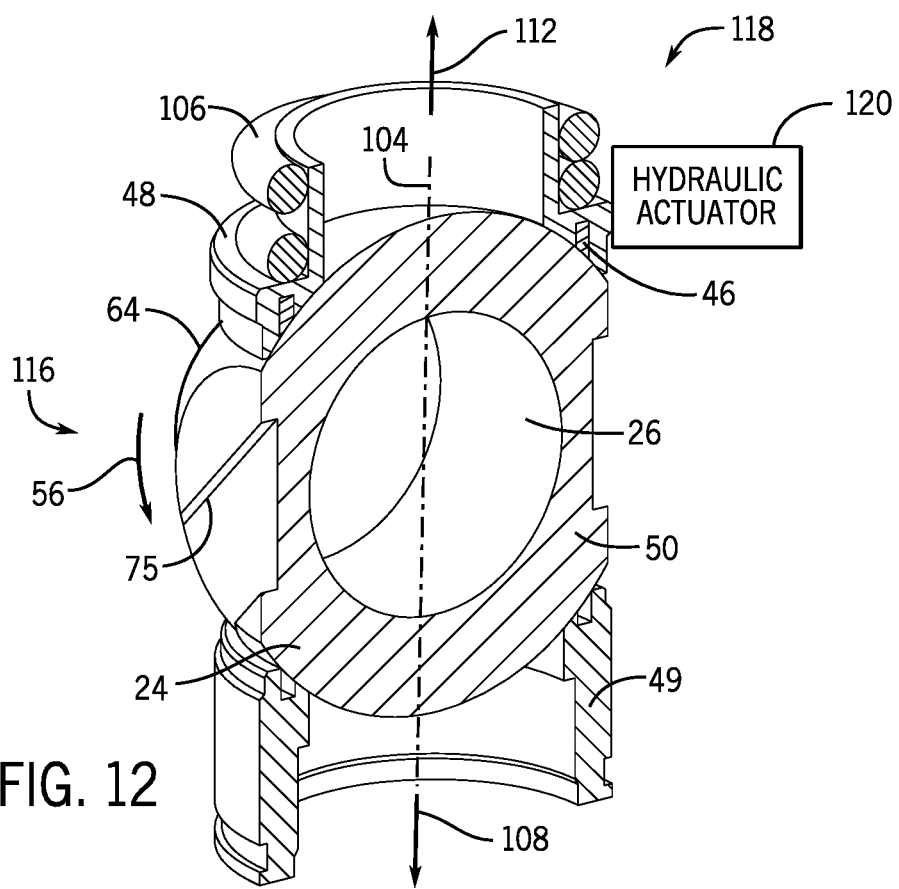
FIG. 12 is a cross-sectional perspective view of a portion of a further embodiment of a ball valve assembly.

FIG. 12 is a cross-sectional perspective view of a portion of a further embodiment of a ball valve assembly 116. In the illustrated embodiment, the ball valve assembly 116 includes a seal retainer actuator assembly 118 configured to move the seal retainer 48 away from the ball 24 along the longitudinal axis 104 of the ball valve assembly 116 while the leading edge portion (e.g., at least the first leading edge of the leading edge portion) moves across the seal 46, thereby further reducing the possibility of contact between a deformed first leading edge and the seal. As a result, contact between the body 50 of the ball 24 and the seal 46 may substantially block fluid flow through the ball valve assembly 116 while the ball 24 is in the illustrated closed position.

In the illustrated embodiment, the seal retainer 48 is movable along the longitudinal axis 104 relative to the ball 24. In addition, the ball valve assembly 116 includes a spring 106 configured to urge the seal retainer 48 toward the ball 24 in the first longitudinal direction 108 along the longitudinal axis 104. In the illustrated embodiment, the spring 106 includes a single coil compression spring. However, in other embodiments, the spring may include one or more other suitable biasing devices (e.g., alone or in combination with the single coil compression spring), such as leaf spring(s), piece(s) of resilient material, pneumatic spring(s), hydraulic spring(s), electromagnetic spring(s), etc. Furthermore, in certain embodiments, hydraulic pressure within the ball valve assembly may also urge the seal retainer toward the ball along the longitudinal axis. Accordingly, in certain embodiments, the spring may be omitted, and the hydraulic pressure may urge the seal retainer toward the ball.

In the illustrated embodiment, the seal retainer actuator assembly 118 includes a hydraulic actuator 120 configured to drive the seal retainer 48 to move away from the ball 24 in the second longitudinal direction 112 along the longitudinal axis 104 while the leading edge portion (e.g., at least the first leading edge of the leading edge portion) moves across the seal 46. For example, in certain embodiments, the hydraulic actuator 120 may be single-acting. In such embodiments, the hydraulic actuator 120 may drive the seal retainer 48 to move in the second longitudinal direction 112 against the bias of the spring 106 before the leading edge portion traverses the seal 46 as the ball 24 rotates in the rotational direction 56. After the leading edge portion (e.g., at least the first leading edge of the leading edge portion) passes the seal 46, the hydraulic actuator 120 may enable the spring 106 and, in certain embodiments, hydraulic pressure within the ball valve assembly to drive the seal retainer 48 in the first longitudinal direction 108, such that the seal 46 engages the outer surface 64 of the body 50 of the ball 24. Furthermore, in certain embodiments, the hydraulic actuator 120 may be double-acting. In such embodiments, the hydraulic actuator 120 may drive the seal retainer 48 to move in the second longitudinal direction 112 before the leading edge portion traverses the seal 46 as the ball 24 rotates in the rotational direction 56. After the leading edge portion (e.g., at least the first leading edge of the leading edge portion) passes the seal 46, the hydraulic actuator 120 may drive the seal retainer 48 in the first longitudinal direction 108, such that the seal 46 engages the outer surface 64 of the body 50 of the ball 24. Because the seal retainer 48 is moved away from the ball 24 while the leading edge portion (e.g., at least the first leading edge of the leading edge portion) traverses the seal 46, the possibility of contact between a deformed first leading edge and the seal is substantially reduced or eliminated. In addition, the friction associated with rotation of the ball may be reduced through a portion of the rotational range of motion of the ball from the open position to the closed position.

The hydraulic actuator may be controlled by one or more hydraulic lines extending from respective valve(s) of a hydraulic control system. The hydraulic line(s) may be used to control the hydraulic actuator alone (e.g., dedicated line(s)), or the hydraulic line(s) may be used to control the hydraulic actuator and other component(s) of the ball valve assembly (e.g., shared line(s)). Furthermore, in certain embodiments, the hydraulic actuator may be controlled by a combination of dedicated line(s) and shared line(s). The valve(s) may control hydraulic fluid flow through the line(s) to control the hydraulic actuator. In certain embodiments, an electronic controller may automatically control the valve(s) to control the position of the valve retainer based on the orientation of the ball (e.g., which may be determined based on sensor input and/or based on fluid flow to the hydraulic inputs). Furthermore, in certain embodiments, a mechanical system (e.g., including lever(s), pin(s), cam(s), follower(s), linkage(s), etc.) may control the valve(s) (e.g., based on the orientation of the ball, the position of the operator, etc.).

While the seal retainer actuator assembly includes the hydraulic actuator in the illustrated embodiment, in other embodiments the seal retainer actuator assembly may include a pneumatic actuator, an electromechanical actuator, or another suitable type of actuator. In addition, while the seal retainer actuator assembly includes a single actuator in the illustrated embodiment, in other embodiments, the seal retainer actuator assembly may include multiple actuators (e.g., of the same type or of different types). By way of further example, in certain embodiments, the seal retainer actuator assembly may include a protrusion on the operator. In such embodiments, as the operator translates to drive the ball to rotate from the open position to the closed position, the protrusion on the operator may contact the seal retainer, thereby driving the seal retainer to move away from the ball. The protrusion may be positioned such that the protrusion contacts the seal retainer before the leading edge portion of the ball traverses the seal. In addition, the protrusion and/or a corresponding recess in the seal retainer may be shaped such that the protrusion disengages the seal retainer as the seal retainer reaches a stop within the ball valve assembly, thereby enabling the spring and, in certain embodiments, hydraulic pressure within the ball valve assembly to drive the seal retainer in the first longitudinal direction such that the seal engages the outer surface of the body of the ball. In certain embodiments, the protrusion may be coupled to the seal retainer and configured to engage a slot within the operator. Furthermore, in certain embodiments, the seal retainer actuator assembly may include any other suitable device(s)/structures(s) configured to drive the seal retainer away from the ball while the leading edge portion of the ball (e.g., at least the first leading edge of the leading edge portion) traverses the seal (e.g., including a suitable control system, such as a control system including an electronic controller, sensors, mechanical linkage(s), other suitable components, or a combination thereof).

While the ball 24 of FIGS. 2-6, which includes the body and the insert, is utilized within the ball valve assembly 116 in the illustrated embodiment, in other embodiments, the ball valve assembly may include the ball 86 of FIGS. 7-8, in which the first and second leading edges are formed by the body. Furthermore, in certain embodiments, the ball valve assembly having the seal retainer actuator assembly may include any other suitable ball, such as a ball having the variations disclosed above with reference to FIGS. 2-8. In addition, in certain embodiments, a ball having a single leading edge (e.g., no radial recess in the leading edge portion) may be employed within the ball valve assembly of FIG. 12. Furthermore, while the ball is supported by/captured between the seal retainer and the cradle in the illustrated embodiment, in other embodiments, the ball may be supported by a trunnion or other suitable structure within the ball valve assembly, and the seal retainer may be biased toward the ball such that the seal contacts the ball at least while the ball is in the closed position. While the ball includes the slot 75 in the illustrated embodiment, in other embodiments, the ball may include any other suitable device(s) configured to interface with an actuator assembly configured to drive the ball to rotate. Furthermore, with regard to the embodiments of FIGS. 9-12, the seal retainer is described as moving relative to the ball. The relative movement may include movement of the seal retainer relative to a body of the ball valve assembly, movement of the ball relative to the body of the ball valve assembly, or a combination thereof. In addition, while contact between the ball and a single seal (e.g., coupled to the seal retainer) is disclosed above with reference to FIGS. 1-12, in certain embodiments, the ball is configured to contact multiple seals (e.g., 1, 2, 3, or more). For example, multiple seals may be coupled to the seal retainer (e.g., and move with the seal retainer in the embodiments disclosed above with reference to FIGS. 9-12). With regard to the ball valve assembly of FIGS. 9-12, in certain embodiments, one or more seals may be coupled to the seal retainer and move with the seal retainer, and one or more seals may be fixed relative to the body of the ball valve assembly.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A ball valve assembly, comprising:
a ball having a fluid pathway and a leading edge portion, wherein the ball is configured to rotate between an open position and a closed position, the fluid pathway is configured to align with a fluid passage of the ball valve assembly while the ball is in the open position to enable fluid flow through the ball valve assembly, and the fluid pathway is configured to be offset from the fluid passage while the ball is in the closed position to block fluid flow through the ball valve assembly;
wherein the leading edge portion comprises a first leading edge configured to cut a line extending through the fluid pathway as the ball rotates from the open position to the closed position, the leading edge portion comprises a second leading edge configured to engage a seal of the ball valve assembly as the ball rotates from the open position to the closed position, and the first leading edge is positioned radially inward from the second leading edge;
wherein the ball comprises a body and an insert coupled to the body by a fastener, and the first leading edge is formed on the insert;
wherein the body has a first portion of a shoulder, the insert has a second portion of the shoulder, and a head of the fastener is configured to contact the first portion of the shoulder and the second portion of the shoulder while the fastener is engaged with the insert and the body.

2. The ball valve assembly of claim 1, wherein the ball is formed from a single piece of material.

3. The ball valve assembly of claim 1, wherein a first radius of curvature of the first leading edge is less than a second radius of curvature of the second leading edge.

4. The ball valve assembly of claim 1, further comprising a seal retainer configured to support the seal within the ball valve assembly.

5. The ball valve assembly of claim 4, wherein the seal retainer is movable along a longitudinal axis of the ball valve assembly relative to the ball.

6. The ball valve assembly of claim 5, comprising a spring configured to urge the seal retainer toward the ball along the longitudinal axis, wherein the ball comprises a cam configured to contact the seal retainer to drive the seal away from the ball while the leading edge portion moves across the seal.

7. The ball valve assembly of claim 5, comprising a hydraulic actuator configured to drive the seal retainer to move away from the ball along the longitudinal axis while the leading edge portion moves across the seal.

8. A ball valve assembly, comprising:
a ball having a fluid pathway and a leading edge portion, wherein the ball is configured to rotate between an open position and a closed position, the fluid pathway is configured to align with a fluid passage of the ball valve assembly while the ball is in the open position to enable fluid flow through the ball valve assembly, and the fluid pathway is configured to be offset from the fluid passage while the ball is in the closed position to block fluid flow through the ball valve assembly;
wherein the leading edge portion has a radial recess that establishes a cutting edge positioned radially inward of an outer surface of the ball, the cutting edge is configured to cut a line extending through the fluid pathway as the ball rotates from the open position to the closed position, and the outer surface of the ball is configured to contact a seal of the ball valve assembly while the ball is in the closed position;
wherein the ball comprises a body and an insert coupled to the body by a fastener, and the cutting edge is formed on the insert;
wherein the body has a first portion of a shoulder, the insert has a second portion of the shoulder, and a head of the fastener is configured to contact the first portion of the shoulder and the second portion of the shoulder while the fastener is engaged with the insert and the body.

9. The ball valve assembly of claim 8, wherein the leading edge portion comprises a seal-engaging edge at a transition between the radial recess and the outer surface of the ball.

10. The ball valve assembly of claim 9, wherein a first radius of curvature of the cutting edge is less than a second radius of curvature of the seal-engaging edge.

11. A ball valve assembly, comprising:
a seal;
a ball having a fluid pathway and a leading edge portion, wherein the ball is configured to rotate between an open position and a closed position, the fluid pathway is configured to align with a fluid passage of the ball valve assembly while the ball is in the open position to enable fluid flow through the ball valve assembly, the fluid pathway is configured to be offset from the fluid passage while the ball is in the closed position to block fluid flow through the ball valve assembly, the leading edge portion comprises a first leading edge configured to cut a line extending through the fluid pathway as the ball rotates from the open position to the closed position, the leading edge portion comprises a second leading edge configured to engage the seal as the ball rotates from the open position to the closed position, and the first leading edge is positioned radially inward from the second leading edge;

a seal retainer configured to support the seal within the ball valve assembly, wherein the seal retainer is movable along a longitudinal axis of the ball valve assembly relative to the ball; and a seal retainer actuator assembly configured to move the seal retainer away from the ball along the longitudinal axis while the leading edge portion moves across the seal;

wherein the ball comprises a body and an insert coupled to the body by a fastener, and the first leading edge is formed on the insert;

wherein the body has a first portion of a shoulder, the insert has a second portion of the shoulder, and a head of the fastener is configured to contact the first portion of the shoulder and the second portion of the shoulder while the fastener is engaged with the insert and the body.

12. The ball valve assembly of claim 11, wherein a first radius of curvature of the first leading edge is less than a second radius of curvature of the second leading edge.

* * * * *